T

(12) United States Patent
Jani et al.

(10) Patent No.: US 6,334,466 B1
(45) Date of Patent: Jan. 1, 2002

(54) ABRASION-RESISTANT MATERIAL HANDLING HOSE

(75) Inventors: Bhargav Jani, Highlands Ranch; Fredrick R. Chipps, Englewood, both of CO (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/169,606

(22) Filed: Oct. 9, 1998

(51) Int. Cl.⁷ .................................. F16L 11/08
(52) U.S. Cl. .................. 138/141; 138/126; 138/153; 138/172; 138/DIG. 3
(58) Field of Search ................. 138/126, 141, 138/153, 129, 146, 172, DIG. 7, DIG. 3

(56) References Cited

U.S. PATENT DOCUMENTS

| | | | |
|---|---|---|---|
| 4,100,827 A | * 7/1978 | Flemming | 138/149 X |
| 4,163,619 A | 8/1979 | Fales | 138/103 X |
| 4,401,135 A | 8/1983 | Andra et al. | 138/118.1 |
| 4,402,346 A | * 9/1983 | Cheetham et al. | 138/129 |
| 4,675,780 A | 6/1987 | Barnes et al. | 138/103 X |
| 5,026,479 A | 6/1991 | Bikson et al. | 210/321.8 |
| 5,247,897 A | * 9/1993 | Pepp | 114/219 |
| 5,460,416 A | 10/1995 | Preidrich et al. | 138/123 X |
| 5,511,619 A | * 4/1996 | Jackson | 138/140 X |
| 5,622,211 A | 4/1997 | Martin et al. | 138/177 |
| 5,647,400 A | 7/1997 | Jani et al. | 138/126 |
| 5,868,169 A | 2/1999 | Catallo | 138/98 |
| 5,941,438 A | * 8/1999 | Price | 224/662 |

FOREIGN PATENT DOCUMENTS

| | | |
|---|---|---|
| GB | 1049978 | 11/1966 |
| GB | 1549848 | 4/1975 |
| GB | 2078900 | 6/1981 |
| WO | WO 9425790 | 11/1994 |

OTHER PUBLICATIONS

Goodyear Tire and Rubber Company, "Innovations", 3/98, second page, section entitled, "FABCHEM ARC".

* cited by examiner

Primary Examiner—Patrick Brinson
(74) Attorney, Agent, or Firm—M. S. Olson, Esq.; C. H. Castleman, Esq.; S. G. Austin, Esq.

(57) ABSTRACT

Material handling hose having an abrasion-resistant cover element is disclosed. The hose comprises an inner tube, a reinforcement member, an intermediate layer and the abrasion-resistant cover element. The cover element does not cover the entire surface of the intermediate layer, but includes apertures or gaps through which a portion of the underlying intermediate layer is exposed to the outside environment. The apertures allow for venting of high volatility materials through the hose body, and provide regions of relatively high coefficient of friction, to facilitate handling of the hose.

13 Claims, 2 Drawing Sheets

ABRASION-RESISTANT MATERIAL HANDLING HOSE

BACKGROUND OF THE INVENTION

The present invention relates to abrasion-resistant, durable material handling hose for use in industrial applications, and particularly to acid chemical and/or petroleum product bulk transfer hose having an improved abrasion-resistant cover element.

Material handling hose for use in industrial applications including tanker truck transfer, storage tank transfer, ship and/or barge transfer, and for conveying materials including acid chemicals and petroleum products, such as gasoline, diesel fuel, etc., commonly include an elastomeric, thermoplastic or plastic inner liner or tube, a suitable reinforcement member, and a suitable cover to provide flexibility and/or ease of handling. The inner liner may be of a permeable, semi-permeable or substantially chemical impermeable variety, depending in general on the material to be conveyed. For acid chemical applications, highly chemical resistant polyfluorocarbon thermoplastics or other substantially chemical impermeable materials are generally employed to minimize the risk of environmental contamination by the conveyed fluid. For petroleum product applications, semi-permeable materials including acrylonitrile butadiene rubber ("NBR") are advantageously employed as the inner liner material in order to allow any highly volatile material remaining in the hose between transfer operations to vent through the hose materials to the outside environment in order to reduce or eliminate pooling of such material within the hose.

Because the bulk transfer applications to which the present invention is particularly directed frequently involve dragging lengths of such hose across abrasive flooring materials on a regular basis, wear of the cover element and consequent exposure of the inner hose materials is a significant problem. To address this problem, it has been suggested to increase the relative thickness of the cover element, in order to allow for some wear thereof without the risk that inner hose layers will be compromised within a normal service period. This solution is not completely satisfactory because even without such additional cover thickness, this type of hose, typically having an inner diameter of from about 1 to about 4 inches (2.5 to 10.2 cm) or even greater, is generally quite heavy and may be awkward to handle. It is commonplace that more than one operator is needed to drag such hose from one location to another, or to bring it to the point of operation. The incorporation of additional cover material would is thus likely serve to exacerbate the weight and handling difficulties of such hose.

Alternatively, it has been suggested for some applications, e.g., hydraulic hose, to add an abrasion resistant veneer or film onto the outer surface of the aforementioned cover, such that that "cover" actually becomes an intermediate layer between the inner tube and reinforcement member on one side, and the outer veneer or film on the other. The abrasion resistant outer veneer is advantageously formed of a plastics material having a relatively low coefficient of friction compared to the intermediate layer, and may be applied for example via known methods in a spiral-type configuration about the hose, such that it completely covers the outer surface of the intermediate layer of the hose. The lower effective coefficient of friction of the hose results in decreased wear and consequent reduction in hose damage over unprotected hose.

This proposed solution does not satisfactorily resolve the problems associated with material handling hose of the type presently contemplated for at least two reasons. First, the hose having a low coefficient of friction cover is slippery and therefore difficult to establish and maintain a grip upon or otherwise handle. This is particularly troublesome since as noted, such hose may be quite heavy. This combination of characteristics would result in a material handling hose which is not only difficult to handle due to the increased stiffness of the typically plastics cover element, cumbersome and relatively expensive to operate (in that two operators may be needed to safely handle it), it could make handling the hose more dangerous as well. The contents may be corrosive, toxic, flammable or otherwise hazardous, and the tendency for the operators to lose their grip and cause a chemical spill would likely increase due to the effective lower coefficient of friction compared to hose without such cover element.

Second, if such hose is used to convey highly volatile materials, i.e., materials containing about 25% or more volatile compounds such as petroleum products, some gas or liquid may become entrapped within the semi-permeable hose layers during hose contact. The utilization of a substantially impermeable cover element would in such case potentially create a safety hazard, since such trapped material would not be able to vent through the hose body to the outside environment. Thus, any benefit derived from including a permeable or semi-permeable inner liner in such applications would generally be lost by including the abrasion-resistant cover.

Thus, it is an object of the present invention to overcome the disadvantages of the prior art by providing a material handling hose which exhibits excellent abrasion resistant characteristics, but which nonetheless exhibits good handling characteristics.

It is a further object of the present invention to provide such a hose which allows for maintenance or reduction of the weight of its intermediate layer over prior art configurations without significant detraction from its performance capability or reduction in its expected service life.

It is yet another object of the present invention to provide such a hose incorporating an abrasion-resistant cover element which nonetheless allows for venting of residual gases. It is still a further object of the present invention to provide a material handling hose having a cover element which allows for the incorporation of an identifying design or color, and thus allows for the reduction or elimination of colored rubber stocks.

SUMMARY OF THE INVENTION

The present invention provides a material handling hose having a highly abrasion-resistant cover element. The hose comprises a reinforcement layer or member sandwiched between a generally tube-shaped inner liner or layer and a generally tube-shaped intermediate layer, which layers may be formed of the same or different suitable elastomeric, thermoplastic or plastic materials. The hose furthermore comprises the aforementioned abrasion-resistant cover element, which is coaxially disposed about and attached to at least a portion of the intermediate layer, on the side thereof opposite that attached to the reinforcement member. The abrasion-resistant cover element preferably possesses a coefficient of friction lower than that of the intermediate layer, and is preferably substantially impermeable to most common chemicals. The abrasion-resistant cover element moreover does not cover the entire outer surface of the intermediate layer to which it is attached, but instead includes gaps or apertures which are substantially unobstructed, such that the portions of the intermediate layer beneath such apertures are exposed to the outer environment throughout the service lifetime of the hose. The material of the intermediate layer may occupy at least a portion of the cavities formed by such gaps or apertures.

DESCRIPTION OF THE PREFERRED EMBODIMENTS

Figure 1:
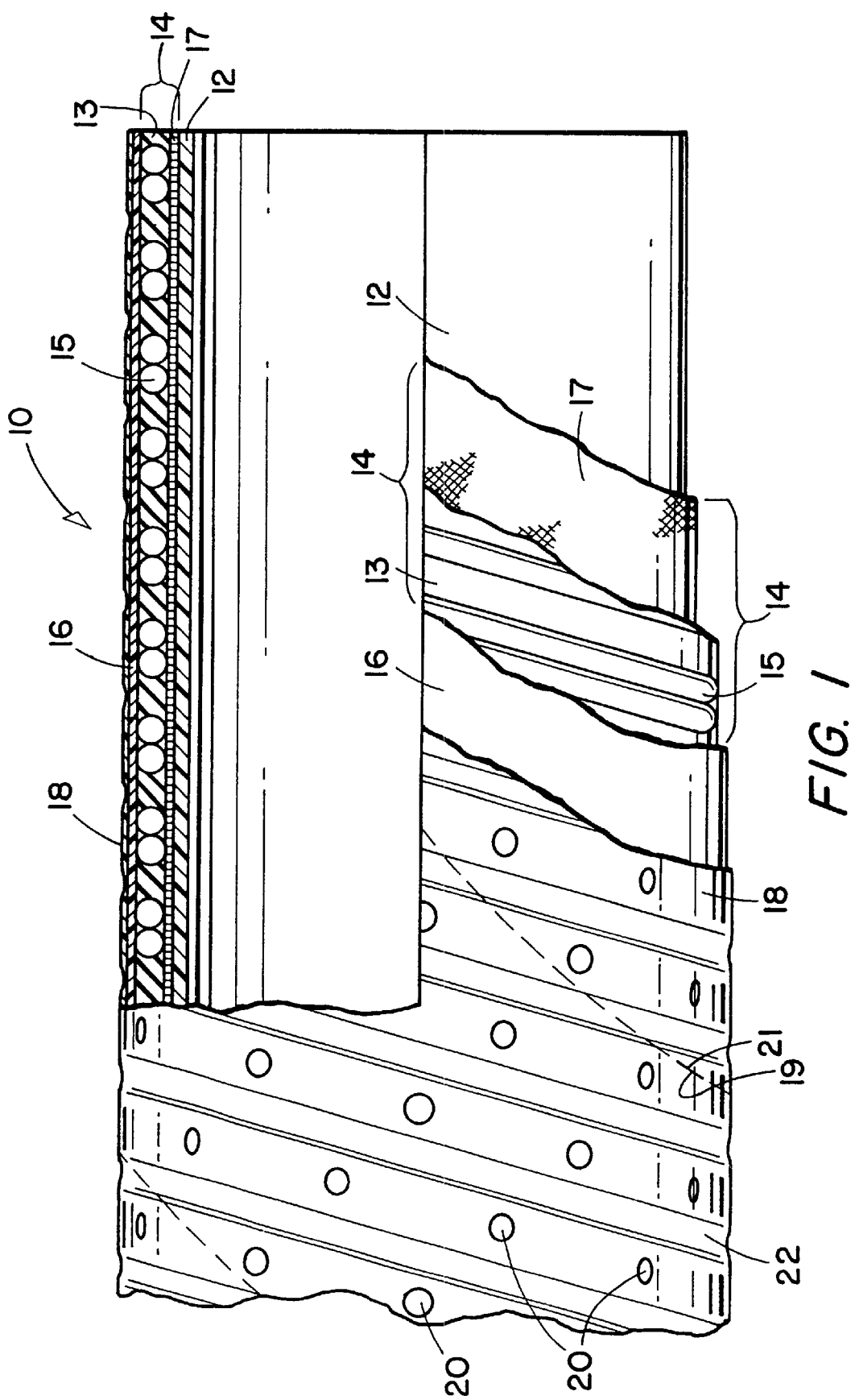
FIG. 1 is a layered, partially cut-away side view of a hose constructed in accordance with one embodiment of the present invention.

Referring to FIG. 1, a material handling hose 10 constructed in accordance with one embodiment of the present invention is shown. FIG. 1 shows a partial cut-away side view with each of the elements of the hose 10 shown telescoped about one another. The elements of the hose 10 are not necessarily drawn to scale, but indicate a preferred construction of the present invention. The hose 10 includes an inner liner or tube 12, which in the figure shown, possesses a single-layer construction, but which may alternatively possess a multi-layer construction as set forth, e.g., in U.S. Pat. No. 5,647,400, the contents of which are hereby incorporated by reference. The embodiment of the present invention illustrated in FIG. 1 furthermore comprises at least one reinforcing layer or member 14 which is coaxially disposed about the inner tube 12, and is attached to at least a portion thereof. The reinforcement member 14 preferably comprises one or more layers of a reinforcing fabric 17, one or more supporting wires or braid 15 helically wrapped about the underlying hose elements, and one or more supporting gum layers 13 formed generally of a suitable elastomeric material, sandwiched between the reinforcing fabric 17 and the supporting wire or braid 15. In the embodiment shown, only one reinforcing fabric layer 17 is shown, but a second reinforcing fabric layer may also be utilized, preferably in opposite lay sense to the first layer, and disposed about the helical wire or braid 15. This configuration is also described in aforementioned U.S. Pat. No. 5,647,400.

An intermediate layer 16 is coaxially disposed about the reinforcing layer 14, such that the reinforcing layer 14 is sandwiched between the inner tube 12 on one side and the intermediate layer 16 on the other.

The material handling hose of the present invention moreover includes an abrasion-resistant cover element 18 which is coaxially disposed about and attached to at least a portion of the intermediate layer 16, on the surface thereof opposite that attached to the reinforcement layer 14. The abrasion-resistant cover element 18 does not cover the entire surface of the intermediate layer 16 to which it is attached, but instead includes apertures or gaps 20, which expose a portion of the underlying intermediate layer 16 to the outside environment.

All of the individual materials and techniques used in the construction of the material handling hose of the present invention, with the exception of the particular form of the preferred cover element 18 described in further detail below, are well known to the art. Preferred materials for a given application may be suitably selected by the skilled reader. For the inner tube member 12, reinforcement supporting layer 16 where utilized and intermediate layer 16, which may be formed of the same or different materials, suitable materials include plastics, thermoplastics and elastomeric materials as appropriate for a given fluid handling application, and include but are not limited to polytetrafluoroethylene (PTFE) or tetrafluoroethylene/hexafluoropropylene copolymers (FEP), cross-linked polyethylene, polypropylene, rubber modified cross-linked polyethylene available under the trademark GATRON, ethylene-alpha-olefin elastomers including ethylene propylene diene terpolymers (EPDM), ethylene propylene copolymers (EPM), polyolefin compositions available under the trade mark ALCRYN, thermoplastic elastomers available under the trade mark SANTOPRENE, nitrile rubbers including acrylonitrile butadiene rubber, polyvinyl chloride (PVC), styrene butadiene rubber, halogenated polymers including chlorinated polyethylene and chlorosulfonated polyethylene, chloroprene including that available under the trade mark NEOPRENE, and blends of one or more of the foregoing. The materials may include common additives as conventionally utilized in the art. In elastomeric compositions for example, the formulations may include reinforcing agents, fillers, plasticizers, accelerators and extenders, in amounts customarily utilized for a given fluid handling application. Suitable formulations, curatives and manufacturing and curing techniques are well known in the material handling hose-building art and may be properly selected for a given application by the skilled reader. Some examples which may be suitable in the practice of the present invention are described in *The Vanderbilt Rubber Handbook,* 13$^{th}$ ed., R. T. Vanderbilt Co., CI., 1990.

As noted above, the inner tube member may be of a single layer variety, or may comprise two or more layers which may or may not be bonded together with a suitable adhesive. Appropriate inner tube dimensions are well known to the art. For hose having an inner diameter of from about 1.5 inches (3.8 cm) to about 4 inches (10.2 cm) for example, the inner tube may preferably have a thickness of from about 0.05 inches (0.13 cm) to about 0.15 inches (0.38 cm), and more preferably of from about 0.07 inches (0.18 cm) to about 0.12 inches (0.30 cm). The intermediate layer may also comprise one or more layers, as is known in the art. For acid chemical applications, the preferred material for use as the inner tube member comprises a single-layer GATRON tube, or a dual-layer PTFE/GATRON laminate bonded together by a suitable adhesive. This latter preferred embodiment is fully described in aforementioned U.S. Pat. No. 5,647,400. For such application, the preferred material for the intermediate layer and supporting layer is EPDM due to its good weatherability, ozone resistance and heat resistance, and its good adhesion to the preferred cover element set forth in further detail below.

For petroleum product and other high volatility chemical transfer, the inner tube member is preferably formed of an acrylonitrile rubber composition due to its good fuel resistance and the intermediate layer is formed of a suitable acrylonitrile butadiene rubber, polyvinyl chloride and styrene butadiene rubber blend ("NBR/PVC/SBR"), due to its adequate fuel resistance and good adhesion characteristics when utilized with the preferred cover element material described below. In a preferred embodiment of the present invention, the above mentioned blend comprises up to 75% by weight SBR, based on total polymer blend content, more preferably from about 20% to about 60% SBR, and most preferably from about 45% to about 55% SBR. Suitable weight ratios of NBR to PVC in the practice of the present invention are preferably from about 10:1 to about 1:10, more preferably about 2.5:1 to about 1:2.5, and most preferably are about 1:1. SBR is utilized in the blend of this preferred embodiment to improve adhesion of the layer to the cover element, as described more fully below. Appropriate dimensions for such intermediate layer would be readily apparent to one skilled in the relevant art. For hose having an inner diameter of from about 1.5 inches (3.8 cm) to about 4.0 inches (10.2 cm) for example, the intermediate layer may preferably have a thickness of from about 0.01 inches (0.02 cm) to about 0.10 inches (0.25 cm), and more preferably from about 0.02 inches (0.05 cm) to about 0.04 inches (0.05 cm).

In the preferred embodiment of the present invention shown in FIG. 1, the reinforcement member 14 comprises a reinforcing textile 17, a helical strand 15 and a supporting adhesion gum layer 13 for supporting and providing adhesive characteristics to each of these two elements. In the present context, the term, "textile" includes staple fibers and filaments which may or may not be in the form of woven, knit or nonwoven fabrics. The reinforcing textile 17 may moreover be formed of any suitable material, e.g., polyester, nylon, aramid such as that available under the trademark KEVLAR and may be of any suitable configuration, e.g. braid, spiral, weave, knit and tire cord. The reinforcing textile 17 may preferably include a suitable adhesion treatment to improve adhesion to adjacent hose elements. In a preferred embodiment, the reinforcing textile is formed of a polyester tire cord treated with an appropriate adhesive composition, which is wrapped at an angle approximately 45 degrees to the longitudinal axis of the hose so as to provide maximum flexibility thereto. Alternatively, the material may be formed on a bias in order to accomplish this same result. The reinforcing fabric layer or layers 17 may have any suitable dimensions, which would be readily apparent to one skilled in the relevant art. For example, for hose having an inner diameter of from about 1.5 inches (3.8 cm) to about 4 inches (10.2 cm), such hose preferably includes two polyester tire cord fabric layers, one being on either side of a helical wire, and each such fabric layer has a wrapped gauge of from about 0.01 (0.02 cm) inches to about 0.05 inches (0.13 cm), and more preferably of from about 0.02 inches (0.05 cm) to about 0.04 inches (0.10 cm).

Supporting layer 13 surrounds, supports and bonds the helical strand to the adjacent hose members, and is sandwiched between the other reinforcing elements. Such supporting layer may have any suitable dimension, which would be readily apparent to one skilled in the art. For example, for hose having an inner diameter of from about 1.5 inches (3.0 cm) to about 4.0 inches (10.2 cm), such layer may preferably have a thickness of from about 0.01 inches (0.02 cm) to about 0.06 inches (0.15 cm), and more preferably from about 0.02 inches (0.05 cm) to about 0.05 inches (0.13 cm).

The reinforcement member 14 may moreover preferably include one or more helical strand, wire or braid 15, which contributes to the small bend radius of the hose. The strand, wire or braid 15 may be of any suitable material, and is preferably formed of carbon steel wire where vacuum resistance is desired, and of plastic in the form of a monofilament where collapse resistance is desired. Such strand, wire or braid may have any suitable dimensions, which would be readily apparent to one skilled in the relevant art. For example for hose having an inner diameter of from about 1.5 inches (3.8 cm) to about 4.0 inches (10.2 cm), a carbon steel wire preferably having a gauge of from about 0.05 inches (0.13 cm) to about 0.1 inches (0.25 cm), and more preferably of from about 0.06 inches (0.15 cm) to about 0.08 inches (0.20 cm), is advantageously employed. For hose having an inner diameter of about 2 inches (5 cm) or less, two such wires are preferably employed, at a 1.0 inch (2.5 cm) pitch. For hose having an inner diameter of greater than from about 2 inches (5 cm) to about 4 inches (10 cm), two such wires are beneficially employed at a pitch of 1.5 inches (3.8 cm).

As the abrasion resistant cover element 18, any suitable plastics, thermoplastics, or elastomeric material may be employed, which preferably possesses a coefficient of friction lower than that of the intermediate layer. Because the preferred cover element provides the surface contact area for hose which may be dragged across a floor or other surface from one point to another, this characteristic provides greater abrasion resistance than hose of the prior art which does not include such cover. Suitable materials for the cover element include but are not limited to ultra high molecular weight polyethylene. It is believed that many other materials exhibiting the beneficial qualities of favorable coefficient of friction, sheet-forming capability and adhesion to underlying hose members may also well be utilized, and fall within the scope of the present invention. These materials may include polyfluorocarbon materials such as those available under the trademark TEFLON or THV, the latter being available from 3M Corporation, for example; nylon materials including those available under the trade mark DARTEK by DuPont Chemical Co.; polyester materials including those available under the trade mark SOLEF by Solef Co.; thermoplastic elastomers including those available under the trade mark SANTOPRENE by Advanced Elastomer Systems; and polyether-ester elastomers including those available under the trade mark ARNITEL by DSM Engineering Plastics. Ultra high molecular weight polyethylene is presently preferred in the practice of the present invention, due in part to its ability to be formed into relatively thin sheets, its good adhesion to the preferred underlying hose elements utilizing straightforward techniques, and its durability in use. In order to ensure proper adhesion of this preferred cover element material to the underlying intermediate layer, the latter should possess adequate non-polar character, which may be accomplished for example by including non-polar moieties to otherwise polar compounds. Thus, in the petroleum product transfer application described above, a polar NBR/PVC base blend may be combined with a percentage of non-polar material, e.g., SBR, to improve adhesion of the cover element. In applications incorporating the non-polar EPDM as its intermediate layer however, no additional non-polar component has been needed to obtain adequate adhesion. Moreover, as one skilled in the relevant art would readily appreciate, conventional elastomer additives which would have the effect of decreasing adhesion between elastomers would likely also impair adhesion between the intermediate layer and the cover element of the present invention if such additives were utilized in the intermediate layer. Thus, it is presently believed for example that the incorporation of waxes and/or some antioxidants in amounts above their solubility in the elastomer, which technique is commonly used to improve elastomer weatherability by migrating to the elastomer surface to form a protective layer thereon, may in some cases negatively affect adhesion between the intermediate layer and the cover element in the practice of the present invention.

The cover element may have any thickness appropriate for a given application. In general, the cover element should have a thickness sufficient to allow for its application to and maintenance upon the hose. Where greater hose flexibility is desired, the cover element thickness should be properly selected to allow for same. The appropriate thickness for a given application is substantially the same as that selected for cover elements of the prior art, which would be readily appreciated by one skilled in the relevant art. In a preferred embodiment of the present invention, for hose having an inner diameter of from about 1.5 to about 4 inches (about 4 to about 10 cm), a cover element gauge may preferably be from about 0.0005 inches to about 0.05 inches (from about 0.001 cm to about 0.13 cm); more preferably from about 0.001 inches to about 0.01 inches (from about 0.002 cm to about 0.02 cm), and most preferably from about 0.002 inches to about 0.005 inches (0.005 cm to about 0.013 cm).

In the practice of the present invention, the cover element does not entirely cover the underlying intermediate layer, but instead includes gaps or apertures which preferably extend through the entire thickness of the cover element to expose a portion of the intermediate layer. Thus, a portion of the underlying intermediate layer is exposed to the outside environment throughout the service life of the hose. In a preferred embodiment of the present invention, these apertures or gaps occur in a more or less regular pattern across at least a portion of the hose.

The incorporation of apertures in the cover element of the present invention provides multiple benefits. First, the exposure of a portion of the intermediate layer improves the handling characteristics of the hose by providing areas on the hose outer surface possessing a greater coefficient of friction than the cover element. These exposed areas of the intermediate layer present relatively high coefficient of friction points or regions, one or more of which the operator would likely contact or engage with his or her hand in grasping the hose. These higher coefficient of friction points enable the hose operator to establish and maintain a grip on the hose more easily than on hose being completely covered with a low coefficient of friction cover element.

Second, in petroleum product applications or other applications involving the conveyance of highly volatile materials and in which underlying layers of the hose are at least semi-permeable to such materials, the apertures allow for permeation or venting to the outside environment of any residual gases within the hose, such as that which may occur during transfer operations. In the absence of such venting capability, the possibility of the accumulation of hydrocarbon gases within the hose would create a significant health and safety hazard. Thus in the practice of a preferred embodiment of the present invention wherein the cover element is formed of an ultra-high molecular weight polyethylene film or sheet, the presence of such apertures is of critical importance, since this material is otherwise substantially impermeable to most such materials.

Third, the presence of apertures in a substantially impermeable cover element reduces or eliminates the risk of blister formation and eventual delamination of the cover element from the underlying hose materials, which may occur when for example a portion of the transfer fluid permeates through the inner tube member and reinforcement layer and becomes trapped beneath the cover element. According to the provisions of the present invention, such fluid would conversely be allowed to pass through the cover element apertures to the outer environment.

Fourth, the apertures likely provide sites for improved adhesion in the form of mechanical bonding wherever they occur across the body of the hose. In curing the hose as described more fully below, a small amount of the intermediate layer material is generally forced at least partially through the apertures, and likely engages the boundaries of the apertures to create individual areas of mechanical bonding across the hose body. This would likely provide improved adhesion compared to hose utilizing a cover element which completely covers the underlying hose materials and thus offers significantly fewer mechanical bonding sites. In a most preferred embodiment of the present invention, the material of the intermediate layer in the area of the apertures or gaps is substantially flush with the surface of the cover element.

Figure 3:
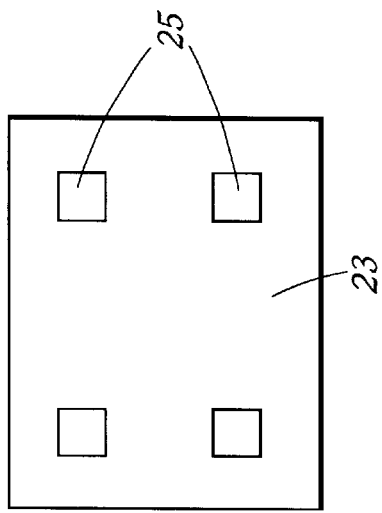
FIG. 3 is a cover element pattern of another embodiment of the present invention; and, FIG. 4 is a cover element pattern of yet another embodiment of the present invention.
Figure 4:
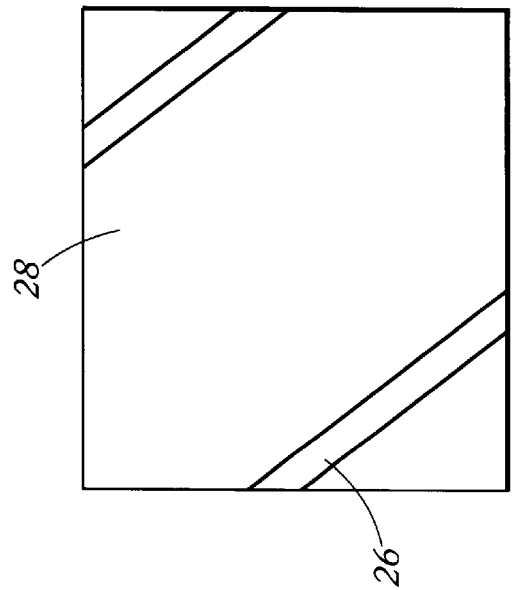
Figure 2:
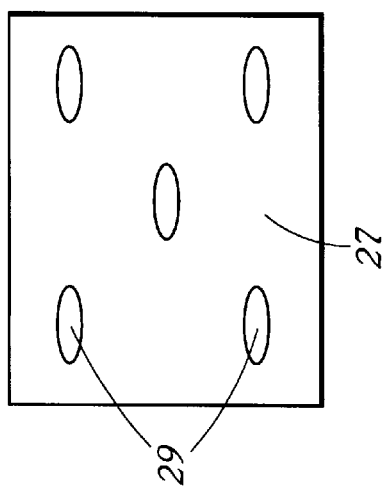
FIG. 2 is a cover element pattern of one embodiment of the present invention.

The apertures may have any configuration suitable for a given application, including but not limited to alternating gaps 26 and spans of solid cover element material 28 in a spiral configuration about the hose body as shown for example in FIG. 4, and holes 20, 29, 25 in the otherwise solid cover element material 18, 27, 23 as shown for example if FIGS. 1, 2 and 3. In the alternating gap and span configuration, the cover element would be in the form of a substantially continuously solid sheet having substantially no gaps, apertures or interruptions, and the apertures of the present invention would be formed in the manner of application of the cover element to the hose body, as described below. In the case of the hole-type aperture configuration, the cover element could beneficially be formed of a sheet having pre-formed apertures, holes or gaps, and the cover element sheet having such holes already formed therein could be applied to the intermediate layer as described below.

With respect to the latter-described configuration, such holes may be of any desirable shape, e.g., substantially round, oval, square, triangular, etc., having any suitable cross-sectional area. For example, in the case of substantially round apertures, such apertures may have diameters of from 0.025 inches (0.06 cm) or less, to up to 1 inch (2.5 cm) or more. Possible variations in the aperture pattern which may advantageously be employed are shown in FIGS. 1, 2 and 3, wherein each cover element 18, 23, 27, respectively, includes one or more such apertures 20, 25, 29. In a preferred embodiment of the present invention as shown in FIG. 1, the cover element 18 is in the form of an ultra high molecular weight polyethylene film or veneer having substantially round holes 20 occurring at more or less regular intervals on the film. The holes preferably possess a generally round shape, and a diameter of from about 0.1 inches (0.25 cm) to about 0.5 inches (1.3 cm), and more preferably of from about 0.16 inches (0.41 cm) to about 0.20 inches (0.51 cm). According to a preferred embodiment of the present invention, a sufficient number or proportion of apertures or gaps are formed in the cover element such that less than 50%, more preferably less than about 25% and most preferably from about 1% to about 15% of the underlying intermediate layer is exposed to the outside environment. These preferred levels provide a balance of abrasion resistance, grip-ability or ease of handling, and aesthetics which result in a highly preferred material handling hose. In a most preferred embodiment, generally round shaped holes, having a diameter of from about 0.18 inches (0.46 cm) to about 0.19 inches (0.48 cm) are incorporated in an otherwise solid ultra high molecular weight polyethylene cover element, in a sufficient number such that from about 3% to about 7%, and more preferably from about 5% to about 6% of the underlying intermediate layer is exposed.

The cover element may be applied to the underlying hose via any suitable method; many such methods are well known to the art. According to a preferred embodiment of the present invention, the cover element in the preferred form of a sheet or film possessing a substantially regular pattern of apertures or holes as described above is applied to an otherwise conventionally built hose in the following manner. The cover element film 18, having two lateral ends or edges 19, 21 (shown in phantom) defining its width, and a length which generally exceeds its width, is applied to the surface of the intermediate layer 16 in a spiral-type configuration comprising a series of turns about the outer circumference of the hose such that the lateral edges 19, 21 of the film on adjacent turns are generally in abutting relation with one another.

This configuration is presently preferred for example, over alternating spans of cover element and gaps, such as may be accomplished by applying the cover element film in a spiral, but maintaining a distance between adjacent lateral edges 19, 21 of the film on adjacent turns about the hose. In such latter case the lateral opposing edges of the film on adjacent turns about the hose body would run generally parallel one another, but would leave a gap or aperture between them which would expose a continuous portion of the intermediate layer.

It is presently believed that the preferred aperture configuration set forth above may be more resistant to snagging or tearing away of the cover element than the alternating gap and span configuration noted above. As noted above, in service the subject hose may be dragged across the workplace floor from one point to another. The area may include equipment or other foreign bodies which may include sharp edges or corners. It is believed that the preferred aperture configuration would prevent or reduce the possibility of the tearing away of the cover element from the balance of the hose body better than the alternative gap and span configuration in the case where such sharp edges were to come into contact with and snag a portion of the cover element. It is believed that the apertures in the preferred configuration would tend to serve as tear termination points in such instances. That is, a tear which may otherwise propagate across a large span of cover element would instead extend across only a few apertures, without damaging or ripping a large portion of the cover element.

Moreover, by providing more aperture/intermediate layer boundaries than the alternating gap and span configuration, it is believed that the preferred aperture configuration may provide improved mechanical bonding and thus improved adhesion between the cover element and the intermediate layer as described above, compared to the alternating gap and span configuration.

In a further preferred embodiment, different colors may be provided in the cover element such that hose incorporating such colored cover element may be easily distinguished or identified. Any conventional method of imparting distinctive colors to ultra high molecular weight polyethylene or other appropriate films may be used. Carbon black may be utilized to impart a black color to the cover element, for example. This characteristic would enable one to manufacture and/or store several types of cover element film, which may be easily identified by one or more distinguishing colors. What's more, the distinctive color of a given cover element may be utilized to identify a certain type of hose, e.g., red cover element for acid chemical hose and yellow cover element for petroleum product transfer hose, etc. This utilization of distinctively-colored cover elements could eliminate the costly practice of preparing and maintaining different colored rubber stocks to allow for identification of different hose types. Alternatively, substantially clear or black cover element sheets may be utilized about an intermediate layer possessing a distinctive color, or a cover element possessing a first color may be utilized about an intermediate layer possessing a second color. The pattern of the aperture may also serve as an identifying mark, e.g., circular or round apertures as shown, for example in FIG. 1 for one type of application and square shaped apertures as shown, for example in FIG. 3, for another.

The flexible, durable chemical-resistant hose of the present invention may be constructed according to conventional hose-building techniques well known to the art, including extrusion or wrapping of the inner tube about a suitably shaped mandrel, and then wrapping the reinforcement layer, supporting layer, helical strand and intermediate layer in turn about the tube. These methods are all well known to the art. As noted above, the cover element may also preferably be wrapped about the hose in a suitable configuration utilizing conventional methods to form the hose assembly. A removable heat shrinkable nylon cure tape and/or filament rope may preferably be wrapped about the hose in conventional manner, the hose cured or vulcanized by conventional methods at temperatures and pressures suitable for the underlying hose elastomers, and the nylon tape and rope removed. These methods are all well known to the art, and are set forth for example in aforementioned *Vanderbilt Rubber Handbook*, $13^{th}$ ed., 1990. Hose products manufactured according to certain embodiments of the present invention for example have been successfully cured utilizing a cure-box method, wherein lengths of previously assembled, uncured hose assemblies having an ultra high molecular weight polyethylene cover element overlying either an NBR/PVC/SBR blend-based intermediate layer or an EPDM-based intermediate layer have been placed into a cure box, the assemblies wrapped with a nylon curing wrap, and steam injected therein. It has been found that excellent adhesion between such cover element and underlying intermediate layers may be accomplished at states of cure somewhat lower than one may anticipate for similar assemblies. In the aforementioned cases of NBR/PVC/SBR blend and EPDM intermediate layers for example, a cure temperature of about 338° F. (170° C.) for cure periods of about 30 minutes and about 60 minutes, respectively, were advantageously employed.

Because in a preferred embodiment, the cover element is formed of an ultra-high molecular weight polyethylene film, which tends to decrease hose flexibility, it is presently preferred that corrugations 22 are imparted in the hose is surface utilizing the aforementioned filament rope during the curing process to improve hose flexibility.

The material handling hose of the present invention provides the possibility of decreasing the weight of material handling hose, in that the suggested practice of incorporating additional material to the intermediate layer (which, in the absence of the inventive cover element, would constitute the surface contact region) to accommodate some wear thereof could now safely and practically be avoided. The inventive hose combines the abrasion resistant qualities of a low coefficient of friction cover element with venting characteristics and the beneficial grip-ability of a hose not having a low coefficient of friction cover element, by including apertures in the surface of the abrasion-resistant cover element. The inventive abrasion-resistant hose moreover provides the possibility of decreasing production and storage costs by allowing for the utilization of different color cover elements or aperture designs to identify different types of hose. While not intending to be limited to such applications, the material handling hose of the present invention provides distinct advantages to both the acid chemical transfer and high volatility chemical transfer industries.

Although the present invention has been described in detail in the foregoing for the purpose of illustration, it is to be understood that such detail is solely for that purpose and that variations can be made therein by one skilled in the art without departing from the spirit or scope of the present invention except as it may be limited by the claims. The invention illustratively disclosed herein may be suitably practiced in the absence of any element which is not specifically disclosed herein.

What is claimed is:

1. A material handling hose, comprising;
   a) an inner tube member;
   b) at least one reinforcement member coaxially disposed about and attached to at least a portion of said inner tube member;
   c) an intermediate layer coaxially disposed about and attached to at least a portion of said reinforcement member; and;
   d) an abrasion-resistant cover element coaxially disposed about and attached to at least a portion of said intermediate layer, said cover element possessing one or more apertures extending through the thickness of said cover element and exposing less than about 50% of said intermediate layer, and said cover element possessing a coefficient of friction lower than that of said intermediate layer.

2. The hose of claim 1 wherein said cover element is in the form of a suitably shaped film having two lateral edges, and which is applied to the surface of said intermediate layer in a spiral configuration comprising two or more turns about the longitudinal axis of the hose, such that said lateral edges of said film on adjacent turns are substantially parallel one another.

3. The hose of claim 2 wherein at least a portion of said lateral edges of said film on adjacent turns are in substantially abutting relation to one another.

4. The hose of claim 3 wherein said apertures are in the form of one or more holes in the otherwise solid cover element film.

5. The hose of claim 1 wherein said apertures expose from about 1% to about 15% of said intermediate layer.

6. The hose of claim 1 wherein said cover element is formed of ultra high molecular weight polyethylene.

7. The hose of claim 1 wherein said cover element has a gauge of about 0.005 cm to about 0.013 cm.

8. The hose of claim 1 wherein at least one of said inner liner and said intermediate layer is formed of a material selected from the group consisting of:
   a) plastics;
   b) thermoplastics;
   c) elastomers, and;
   d) combinations of the foregoing.

9. The hose of claim 1 in the form of an acid chemical transfer hose, and wherein said inner liner is formed of a substantially chemical impermeable rubber-modified cross-linked polyethylene composition, and said intermediate layer is formed of ethylene propylene diene terpolymer rubber composition.

10. The hose of claim 1 in the form of a petroleum product transfer hose, and wherein said inner liner is formed of a chemical semi-permeable nitrile rubber composition, and said intermediate layer is formed of a nitrile rubber/polyvinyl chloride/styrene butadiene rubber blend.

11. The hose of claim 1 wherein said apertures expose less than about 25% of said intermediate layer.

12. The hose of claim 1 wherein said intermediate layer is formed of a material characterized by a first color, and said cover element is formed of a material characterized by a second color distinct from said first color.

13. The hose of claim 1 wherein said hose possesses an outer surface characterized by at least one corrugation.

* * * * *